(12) United States Patent
Rey et al.

(10) Patent No.: US 7,738,390 B2
(45) Date of Patent: Jun. 15, 2010

(54) METHOD OF REPORTING QUALITY METRICS FOR PACKET SWITCHED STREAMING

(75) Inventors: Jose Luis Rey, Darmstadt (DE); Rolf Hakenberg, Darmstadt (DE); Michael Zink, Darmstadt (DE)

(73) Assignee: Panasonic Corporation, Osaka (JP)

( * ) Notice: Subject to any disclaimer, the term of this patent is extended or adjusted under 35 U.S.C. 154(b) by 89 days.

(21) Appl. No.: 10/546,556

(22) PCT Filed: Feb. 4, 2004

(86) PCT No.: PCT/EP2004/001019

§ 371 (c)(1),
(2), (4) Date: May 17, 2006

(87) PCT Pub. No.: WO2004/077785

PCT Pub. Date: Sep. 10, 2004

(65) Prior Publication Data

US 2006/0206617 A1 Sep. 14, 2006

(30) Foreign Application Priority Data

Feb. 25, 2003 (EP) .................................. 03004073

(51) Int. Cl.
*H04J 1/16* (2006.01)
(52) U.S. Cl. ........................................ 370/252; 709/231
(58) Field of Classification Search ................ 370/252, 370/232, 395.52; 709/228, 230, 231, 245
See application file for complete search history.

(56) References Cited

U.S. PATENT DOCUMENTS

2002/0184373 A1* 12/2002 Maes .......................... 709/228

2003/0023710 A1* 1/2003 Corlett et al. ............... 709/223

FOREIGN PATENT DOCUMENTS

| EP | 1235414 | 8/2002 |
|---|---|---|
| JP | 2000-515692 | 11/2000 |
| JP | 2001-25013 | 1/2001 |
| WO | 97/22201 | 6/1997 |

OTHER PUBLICATIONS

PCT International Search Report dated May 10, 2004.
Zink et al.; "LC-RTP (loss collection RTP): reliability for video caching in the Intenet" Proceedings of IEEE workshop on fault-tolerant parallel and distributed systems, XX, XX Jul. 4, 2000, pp. 281-286, XP00217328.
El-Marakby R et al.: "Delivery of real-time continuous media over the Internet" computers and communications 1997, proceedings, second IEEE symposium on Alexandria, Egypt Jul. 1-3, 1997, Los Alamitos, CA, USA, IEEE Comput. Soc. US, Jul. 1, 1997, pp. 22-26, XP002193746, ISBN: 0-8186-7852-6.

(Continued)

*Primary Examiner*—Chirag G Shah
*Assistant Examiner*—Yong Zhou
(74) *Attorney, Agent, or Firm*—Dickinson Wright PLLC

(57) ABSTRACT

A method of reporting quality metrics for packet switched streaming in a wireless network between a server and a client, comprising the step of transporting content data to the server to the client using a real time streaming protocol, the step of reporting at least one quality metric relating to the delivered data stream from the client to the server using both an unreliable transport mechanism, such as UDP, and at least one reliable transport mechanism, such as TCP.

22 Claims, 2 Drawing Sheets

OTHER PUBLICATIONS

Friedman T; Caceres R; Clark A: "RTP Extended Reports (RTP XR)" Internet Draft, 'Online! Jan. 24, 2003, pp. 1-41, XP002249991, Retrieved from the Internet: <URL: http://www.watersprings.org/pub/id/draft-ietf-avt-rtcp-report-extns-02.txt> retrieved on Jul. 31, 2003.

Yon Jun Chung et al.; "Receiver-based congestion control mechanism for Internet video transmission" Circuits and Systems, 1999, ISCAS 99, proceedings of the 1999 IEEE International Symposium on Orlando, FL, USA May 30-Jun. 2, 1999, Piscataway, NJ, USA, IEEE, US, May 30, 1999, pp. 239-242, XP010341133, ISBN: 0-7803-5471-0.

Elsen I et al.; "Streaming Technology in 3G Mobile Communications Systems" Computer, IEEE Computer Society, Long Beach, CA, US, vol. 34, No. 9, Sep. 2001, pp. 46-52, XP001102082, ISBN: 0018-9162.

3GPP TS 26.234 v5.3.0 (Dec. 2002); pp. 1-82.

Japanese Office Action dated Jun. 10, 2008 with English translation thereof.

K. Hashimoto, et al. "Packet and Frame Rate Control Methods for Compressed Video Transmission," Transactions of Information Processing Society of Japan, vol. 39, No. 2, Feb. 15, 1998, pp. 337-346.

\* cited by examiner

METHOD OF REPORTING QUALITY METRICS FOR PACKET SWITCHED STREAMING

FIELD OF THE INVENTION

The present invention relates to a method of reporting quality metrics for packet switched streaming, in particular suitable for the 3GPP streaming service (PSS), but not limited thereto.

BACKGROUND OF THE RELATED ART

Generally, quality metrics will be used for reporting in 3GPP Packet-switched Streaming Services (PSS), where a service provider (server) needs information about the received quality of a video stream delivered to a client (see e.g. 3GPP TS26.234 V 5.3.0 Release 5). To be able to collect this information at the server, the client has to send feedback information about the received quality to the server. This information can only be created at the client, since conditions on the intermediate network and the client itself might influence the received quality of a video stream. The reported metrics are objective (e.g. amount of lost packets during the streaming session) since information about the quality of the delivery should be measured and not about the quality of the content (e.g., bad quality due to bad encoding of the video.) Since all the metrics are objective and not subjective, they can be automatically created at the client without any user interaction.

Packet-switched Streaming Services in 3GPP networks are based on the mechanisms that were invented for streaming in the wired Internet. Hence, known transport protocols, such as RTP/RTCP are used for the data transport (the actual streaming), while RTSP is used to control the streaming session. It has been shown that standardized mechanisms are not sufficient to report quality metrics about the perceived quality at the receiver. E.g., the information that is transported by RTCP receiver reports allows the sender to draw only rudimentary metrics about the quality of the delivered stream, like the number of group members, an RTT estimation to the receivers and the cumulative number of packets lost. These are not enough to inform the server about the quality of the streaming to each receiver. For example the cumulative number of packets lost does not provide precise information about the RTT on which it happened or which packets were actually received and lost. This fact hampers a proper adaptation by the server (rate and quality) and also the application of billing schemes, which will gain in importance as the streaming services become more popular. Therefore an extended mechanism is needed. Summarizing, there are two major problems with the RTCP-based quality metrics reporting:

The transport protocol (usually UDP) used for RTCP messages is not reliable and, thus, the quality metrics cannot be determined reliably.

The information contained in the RTCP receiver report is very restricted and does not give the operators much freedom to specify their own quality metrics.

A detailed overview about 3GPP PSS and the used protocols is given in 3GPP TS26.234 V 5.3.0 Release 5. RTCP is the control protocol for RTP, which is used to distribute control information about the RTP-based data transport. Two important message types in RTCP are sender and receiver reports that are used to exchange information about the data that is transported via RTP (e.g., the total amount of packets sent by the sender). In case the RTP session is based on UDP, which is the case for streaming, the RTCP data will also be transmitted via UDP. Since UDP is an unreliable protocol, a lossless transport of the RTCP data cannot be guaranteed. In order to avoid that RTCP message consume too much bandwidth, RTCP sender and receiver reports can only be sent in certain intervals (e.g., one receiver report each 5 seconds). Hence, the information that can be transmitted via sender and receiver reports is very limited and might not be sufficient to generate useful quality metrics timely. In particular, RTCP provides as exemplary basic metrics, an RTT estimation from sender to each receiver, delay jitter, cumulative number of packets lost, the highest sequence number received, and a packet count on how many packets the sender sent.

As mentioned in the previous section, these metrics are very limited and not extendable, so that new and existing applications (like MPEG4 video and AMR audio) lack a set of metrics to properly report on the received quality for each receiver.

RTSP is the signalling protocol that is used in PSS to control and set up a streaming session. It allows the client to start, stop the stream or jump to any position in time of the stream. Usually, RTSP data is transmitted reliably via the TCP protocol. Next to the control information additional information about the data transport characteristics is exchanged between server and client via RTSP. In addition, certain information can be exchanged during the streaming session.

Quality metrics define a certain set of parameters that are reported from the client to the server and allow the operator to draw conclusions about the quality a stream was delivered to the client. The usage of the information gained by those quality metrics can be manifold. E.g., a billing model could be based on such information or the operator could simply collect the data for its own statistics. As of today, the exact set of parameters for every kind of application is not known and it is debatable if one specific set will fit the needs of all operators in the future. There certainly is a limited set of quality metrics that is necessary in every case like the total amount of lost packets, a rough estimation of the RTT to the clients and an estimation of the delay jitter, as provided by RTCP. However, there are many application specific parameters while other parameters might only be of interest if content is streamed that has been encoded in a specific format.

Since it is not absolutely clear in which way the quality metrics will be used by the operator it would be desirable to find a solution that allows operators to define their own quality metrics for any kind of application. However, this is out of the scope of this invention. We assume the quality metrics subject of transport, which kind of transport is needed for each of the parameters and which peer is responsible for each of them is known to server and client.

To summarize, existing methods allow only limited possibilities of reporting quality metrics from the client to the server in a PSS. This is not sufficient for an operator to obtain a detailed and correct report about the received quality of a video stream at the client.

SUMMARY OF THE INVENTION

The object of the present invention is therefore to provide a method of reporting quality metrics for PSS, which is able to give the operator additional information. This object is solved by a method according to claim 1. Preferred embodiments of the method are subject to various dependent claims.

The general idea is to combine unreliable and reliable transport mechanisms for quality metrics reporting from the client to the server. For example, some minimum but unreliable quality metrics can be obtained from the standard RTCP receiver report. Since this information is always available it should be used as the minimum information if no additional information is provided from the client.

Quality metrics provide a statistical measure about the quality of the service. This information can, e.g., be used for network management decisions or streaming adaptations to deliver better quality to the client, such as rate adaptation and a proper scheduling of the data packets. This would allow the operator to get information about the condition of the network and take countermeasures if the delivered quality is below a certain level in many cases.

The information about the delivered quality could also be used for user billing. If the quality metrics show that the user received a quite bad quality of the data stream, its billing rate for the service could be reduced compared to a user who received the stream in full quality. For this purpose, certain delivery parameter values like the total number of I-frames displayed or the number of times the client had to re-buffer are needed as the client shall pay for the actual quality experienced.

Parameters that are used for quality metrics can be separated into two categories. One group is defined by parameters that are transmitted periodically and unreliably and the other one by parameters that are transmitted reliably (either during or at the end of the session). An example for the first group is the fraction of lost packets compared to the total amount of sent packets, while the amount of client rebuffering is an example for the second. Especially for the second group it is important that these data is transmitted reliably since it will only be transmitted once. A loss of this data could be critical and mean that this quality metric is not available at the server. This is different to data like the number of received packets that is transmitted periodically. A loss means that the information available at the server will be incorrect until new data containing this information arrives at the server.

In addition, the server has also the chance to request that certain quality metrics are transmitted in a reliable manner from the client. This is also useful in cases where unreliably transmitted data has not reached the server during a longer period of time. It also allows the server to gain information, in cases where the client application has not been terminated correctly (e.g., the application crashes). This data might not be up to date but the server has the chance to get a least some information.

Other parameters shall be transmitted only once but in a reliable manner, e.g., the values for the number of times the client re-buffered or the total time spent buffering. One possibility, used here to illustrate the invention, is to transmit these parameters using the RTSP protocol at the end of the streaming session.

Aside from a minimum set of quality metrics, operators should be able to easily define additional metrics, if required. Therefore, a message format for both reliable and unreliable transport mechanisms should be available. In the case of RTCP the extended report blocks (XR) can be used for this purpose. For RTSP the protocol itself contains methods intentionally loosely defined to allow the easy integration of new parameters, for example the methods GET_PARAMETER and SET_PARAMETER.

Note that, beside network operators, also content providers might be interested in the quality metrics since they have a high interest that the streaming has a good quality and also in undertaking the necessary changes to provide such good quality where needed, for example to find the appropriate encoding rate. Without the quality metrics they would not be able to provide tailored contents to the operators.

BRIEF DESCRIPTION OF THE DRAWINGS

The present invention will be explained in further detail with reference to the accompanying drawings, which show.

DETAILED DESCRIPTION OF THE INVENTION

Figure 1:
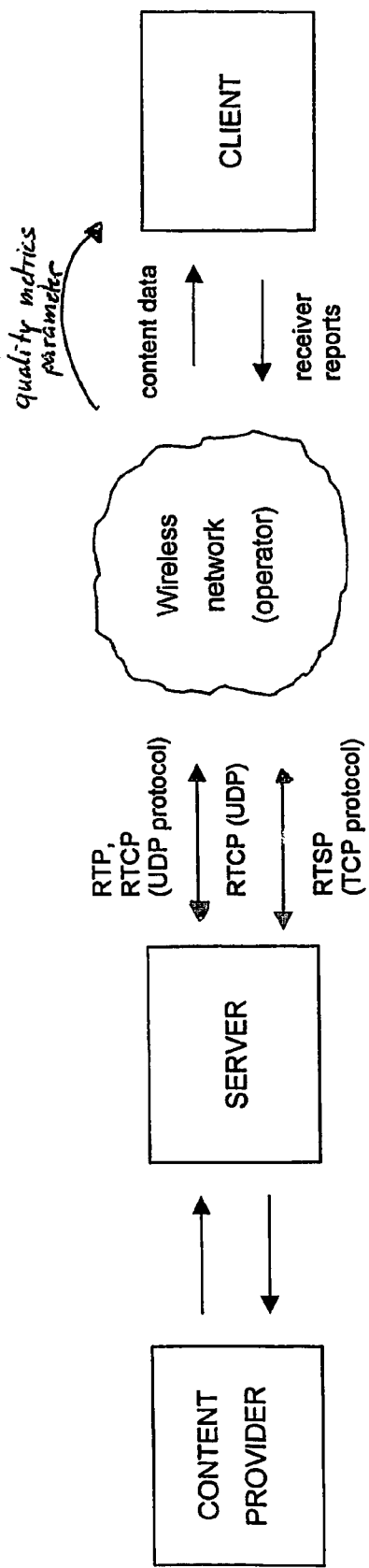
FIG. 1 a typical server-client configuration for carrying out the method according to the present invention and FIG. 2 a schematic communication diagram for illustrating the method of the present invention.

As shown in FIG. 1, a typical system including a server and a client comprises a wireless communication network operated by an operator. The content, which is intended to be delivered from the server to the client is provided either in advance or in real time by a content provider connected with the server. For transporting the content data to the client, the server uses RTP/RTCP. An RTP session is transmitted on top of UDP (being an unreliable protocol) and the RTCP data used to control the streaming session will also be transmitted via UDP. The client sends receiver reports either in certain report intervals using RTCP messages (also based on UDP) or by using RTSP over a reliable transport protocol, like TCP.

According to the method of invention, combined quality metric reporting mechanisms that integrate reliable and unreliable transmission of the quality metrics are employed. Since two transport methods can be used, client and server need to implement a mechanism that coordinates the quality metric transmission. In general, the client actively transmits quality metrics to the server. Alternatively, the server actively requests quality metrics from the client which the client responds with a message containing the requested information.

For the unreliable transport already existing mechanisms and message formats (like the RTCP receiver and sender reports) should be used. Operators could make use of an extension mechanism, like RTP extended reports XR, to allow the transmission of additional quality metrics. The periodic messages bear the advantage that the operator can also obtain quality metrics over time. (E.g., during the first 3 minutes of the streaming session 53 packets were lost, while in the following 2 minutes 33 packets were lost.)

For the reliable transport a TCP-based protocol could be used. One possibility would be to make use of RTSP which is already used in a streaming session.

Figure 2:
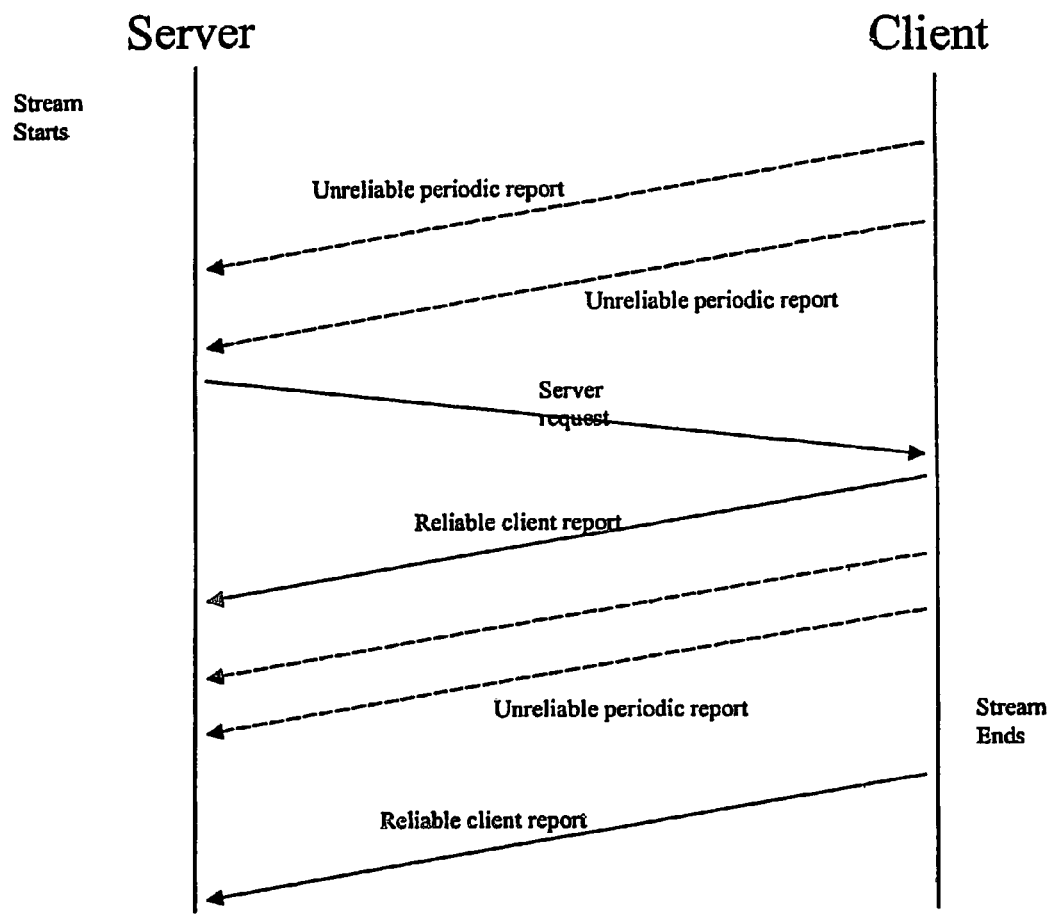

FIG. 2 shows an example of the combined quality metrics reporting. Periodic, unreliable reports are sent continuously during the streaming session. At a certain point in time during the streaming session the server makes a request for a certain quality metric. The client replies this request by transmitting the requested information reliably. Also in the end of the streaming session the client transmits several quality metrics reliably to the server. This new method allows an operator to obtain the desired quality metrics while the additional traffic generated by the reporting is kept as small as possible.

The mechanism that allows the server to specifically request a certain quality metric is in particular beneficial in the case of wireless networks like 3GPP. In such a network higher loss rates, for example during hand-over, can be expected than in wired networks. Thus, the server might not receive periodic unreliable reports for a longer period of time. With this new mechanism the server has the chance to request this information from the client if it is really needed.

In the following, examples of quality metrics, which should be transmitted reliably, shall be described.

A possible parameter of interest is the number of video I-frames or P-frames/B-frames displayed by the client. Further, the minimum average and maximum frame rate measured over the duration of the session constitutes a further important quality metric. Moreover, the number of times the client rebuffered or the length of time (in seconds), the client spent buffering is an interesting quality metric. Finally, the length of time in seconds between a data stream request (i.e. RTSP "play") from the receiver and the first data content packet rendered constitutes a parameter indicating the total stream set-up time. As mentioned before, all above mentioned quality parameters should be reliably transmitted preferably at the end of the session via a reliable transport mechanism, such as RTSP.

Furthermore, example parameters for unreliable transmission of quality metrics will be named. The parameters mentioned in the following could, for example, be transmitted using the RTP extended report blocks XR mechanisms and message formats defined there.

A first metric is the degree of packet reordering, whereby a report block extension for RTCP should be used.

Similarly, the minimum, average or maximum number of content data packets lost in succession and per media channel is a preferred quality metric for unreliable transmission.

Further, the minimum, average or maximum packet delay (in milliseconds) may be transmitted.

A typical quality metric is constituted by the last RTCP sequence number received, i.e. the most recent RTCP sequence number received per media channel. This will help to determine where the user played up to in the data stream. A further example is the cumulative number of content packets successfully received per media channel. The receiver reports lost packets and thus the number of received packets can be determined at the sender. Similarly, the number of content packets expected per media channel could be derived from RTCP sender reports sent from the server. Finally, the packet jitter constitutes a measure of delay variation.

Next, a brief example is used in order to show how the method according to the invention could be realized. For reasons of simplicity only 5 quality metrics should be reported in this example. This small set of metrics are assumed to be already defined by an attribute in the PSS framework, e.g. "3gpp-video-qos-profile-1". Also the way each parameter shall be transmitted (reliably or unreliably) and the peer that must do or query the reporting shall be defined together with the attribute. "3gpp-video-qos-profile-1" defines a Quality of Service QoS metrics profile for video in this case. It is assumed this is known to server and client. It would also be possible to allow the server to change some parameters from reliable to unreliable transmission or vicecersa, e.g. if for the particular application those are not so critical values. There are several ways to negotiate the exact set of quality metric parameters. An example negotiation is shown below.

The quality metrics negotiation between client and server via RTSP would start as follows (C is client and S is server):
C->S: DESCRIBE rtsp://foo/twister RTSP/1.0
    CSeq: 1
    Require: 3gpp-video-qos-profile-1

If the server does not support such set of parameters it would respond like this:
S->C: RTSP/1.0 200 OK
    CSeq: 1
    Unsupported: 3gpp-video-qos-profile-1

On the other hand, if the server supports the requested set of parameters it answers as follows:
S->C: RTSP/1.0 200 OK
    CSeq: 1
    v=0
    o=alice 3203093520 3203093520 IN IP4 host.example.com
    u=http://foo/twister
    m=video 0 RTP/AVPF 98
    c=IN IP4 192.0.0.1
    a=rtpmap:98 H263-2000/90000
a=fmtp:98 profile=3;level=10
a=3gpp-video-qos-profile-1:98

The description above indicates that the server supports the required quality metrics reporting profile and that it is applied to the video session (with payload type value 98).

As mentioned above, the server might decide to shift some parameter from reliable to unreliable transport. In this case if the server would regard the quality metric "number of video I-frames or P-frames/B-frames displayed" as not so important it could set it for unreliable transport, as below:
S->C: RTSP/1.0 200 OK
    CSeq: 1
    v=0
    o=alice 3203093520 3203093520 IN IP4 host.example.com
    u=http://foo/twister
    m=video 0 RTP/AVPF 98
    c=IN IP4 192.0.0.1
    a=rtpmap:98 H263-2000/90000
    a=fmtp:98 profile=3;level=10
    a=3gpp-video-qos-profile-1:98 n_i_P_frames=unreliable The description above indicates that the server supports the required quality metrics reporting profile and that it is applied to the video session (with payload type value 98). In this case the per-default for reliable transmission "number of video I-frames or P-frames/B-frames displayed" is transmitted unreliably, because the server finds it more reasonable.

If the negotiation is not successful the client might decide to request another quality metrics profile or another file, or the server transmit reliably what it at first thought to shift to unreliable transmission. This is implementation specific and out of the scope of this document.

We assume, for example, that in the "3gpp-video-qos-profile-1" three metrics average packet delay, maximum packet delay and packet jitter will be reported periodically from the client to the server via RTCP reporting extensions or other methods. One example message format, using RTCP reporting extensions, for the unreliable reporting is shown below.

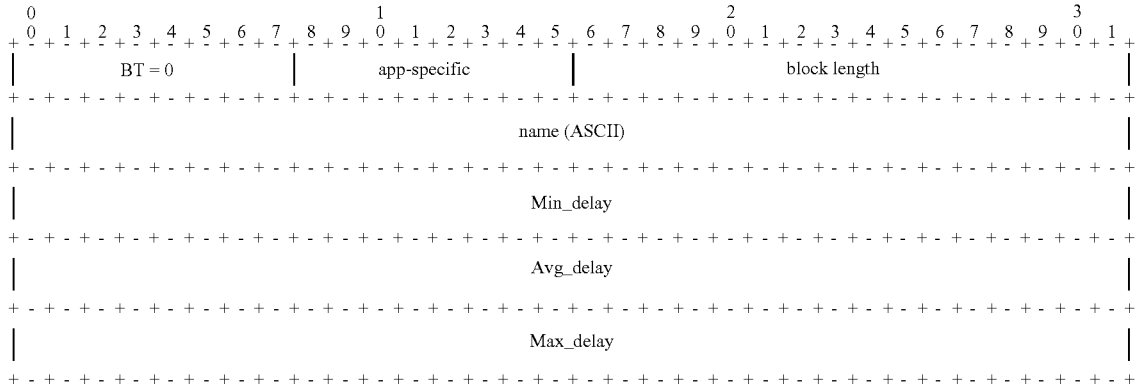

In the end of the streaming session the client transmits the other two quality metrics (number of times rebuffered and time rebuffered) reliably via the RTSP SET_PARAMETER message as shown below:

C->S: SET_PARAMETER rtsp://foo/twister RTSP/1.0
  CSeq: 12
  Content-length: 19
  Content-type: text/parameters
  Times_rebuffrd: 3
S->C: RTSP/1.0 200 OK
  CSeq: 12
C->M: SET_PARAMETER rtsp://foo/twister RTSP/1.0
  CSeq: 13
  Content-length: 24
  Content-type: text/parameters
  Tot_time_rebuffrd: 30
S->C: RTSP/1.0 200 OK
  CSeq: 13

As mentioned, in addition to the automatically generated reports from the client the server can also force the client to send one or more quality metrics reliably if needed. This might, e.g., be the case if periodic unreliable reports have not arrived at the server during a certain amount of time. One example request for the three delay metrics is presented here:

S->C: GET_PARAMETER rtsp://foo/twister RTSP/1.0
  CSeq: 8
  Content-length: 24
  Content-type: text/parameters
  Min_delay
  Avg_delay
  Max_delay
C->S: RTSP/1.0 200 OK
  CSeq: 8
  Content-length: 24
  Content-type: text/parameters
  Min_delay: 5
  Avg_delay: 6.7
  Max_delay: 10

The invention claimed is:

1. A method of reporting plural quality metrics for packet switched streaming via a network between a server and a client, the method comprising the steps of;
   negotiating between the server and the client which quality metric or quality metrics of said plural quality metrics is/are to be reported utilizing a reliable transport mechanism and which quality metric or quality metrics of said plural quality metrics is/are to be reported utilizing an unreliable transport mechanism;
   transporting content data from the server to the client using a real time streaming protocol; and
   reporting the plural quality metrics, which are indicative of the quality with which the data stream has been delivered to the client, from the client to the server using the unreliable transport mechanism and the reliable transport mechanism in accordance with the result of the negotiation, wherein:
   the quality metric reported using the reliable transport mechanism comprises the length of time the client spent buffering, and
   the quality metric reported using the unreliable transport mechanism comprises a degree of packet reordering.

2. The method according to claim 1, wherein the quality metric or quality metrics reported using the unreliable transport mechanism is/are repeated regularly.

3. The method according to claim 1, wherein the quality metric or quality metrics reported using the unreliable transport mechanism is/are transmitted during an ongoing session.

4. The method according to claim 1, wherein the unreliable transport mechanism makes use of real-time transport protocol (RTP) extended reports, (XR).

5. The method according to claim 1, wherein the quality metric or quality metrics reported using the reliable transport mechanism is/are transmitted during or at the end of a session.

6. The method according to claim 1, wherein the reliable transport mechanism uses a reliable transport protocol.

7. The method according to claim 1, wherein a quality metric or quality metrics reported using the reliable transport mechanism is/are transmitted upon request by the server.

8. The method according to claim 1, wherein a quality metric or quality metrics reported using the reliable transport mechanism is/are the number of I-frames or P-frames rendered by the client.

9. The method according to claim 1, wherein a quality metric or quality metrics reported using the reliable transport mechanism is/are at least one of the minimum, average or maximum video frame rate measured over the duration of a session.

10. The method according to claim 9, wherein the reliable transport mechanism is a real time streaming protocol (RTSP).

11. The method according to claim 1, wherein a quality metric reported using the reliable transport mechanism is the number of times the client rebuffered data.

12. The method according to claim 1, wherein a quality metric reported using the reliable transport mechanism is the length of time between a stream request from the client and a first data packet displayed by the client.

13. The method according to claim 1, wherein a quality metric reported using the unreliable transport mechanism is a most recent sequence number received.

14. The method according to claim 13, wherein the unreliable transport mechanism is a real-time transport protocol (RTP) extended report, (XR).

15. The method according to claim 1, wherein a quality metric reported using the unreliable transport mechanism is the number of content packets successfully received.

16. The method according to claim 1, wherein a quality metric reported using the unreliable transport mechanism is the number of content packets expected or lost.

17. The method according to claim 1, wherein the quality metric or quality metrics reported using the unreliable transport mechanism is/are at least one of the minimum, average or maximum of content data packets lost in succession.

18. The method according to claim 1, wherein a quality metric or quality metrics reported using the unreliable transport mechanism is/are at least one of the minimum, average or maximum packet delay.

19. The method according to claim 1, wherein a quality metric reported using the unreliable transport mechanism is the packet jitter.

20. The method according to claim 1, wherein the server requests transmission of a quality metric from the client using the reliable transport mechanism, when an unreliable metric has not been received for a certain period of time.

21. The method according to claim 1, wherein the server shifts at least one parameter from reliable transport to unreliable transport or vice versa.

22. A client for reporting plural quality metrics for packet switched streaming in a network between a server and the client, the client comprising:
  a transceiver unit that negotiates with the server which quality metric or quality metrics of said plural quality metrics is/are to be reported utilizing a reliable transport mechanism and which quality metric or quality metrics of said plural quality metrics is/are to be reported utilizing an unreliable transport mechanism;
  a receiving unit that receives content data from the server using a real time streaming protocol; and
  a transmission unit that reports to the server the plural quality metrics, which are indicative of the quality with which the data stream has been delivered to the client, using the unreliable transport mechanism and the reliable transport mechanism in accordance with the negotiation result of said transceiver unit, wherein:
  the quality metric reported using the reliable transport mechanism comprises the length of time the client spent buffering, and
  the quality metric reported using the unreliable transport mechanism comprises a degree of packet reordering.

* * * * *